Patented June 11, 1929.

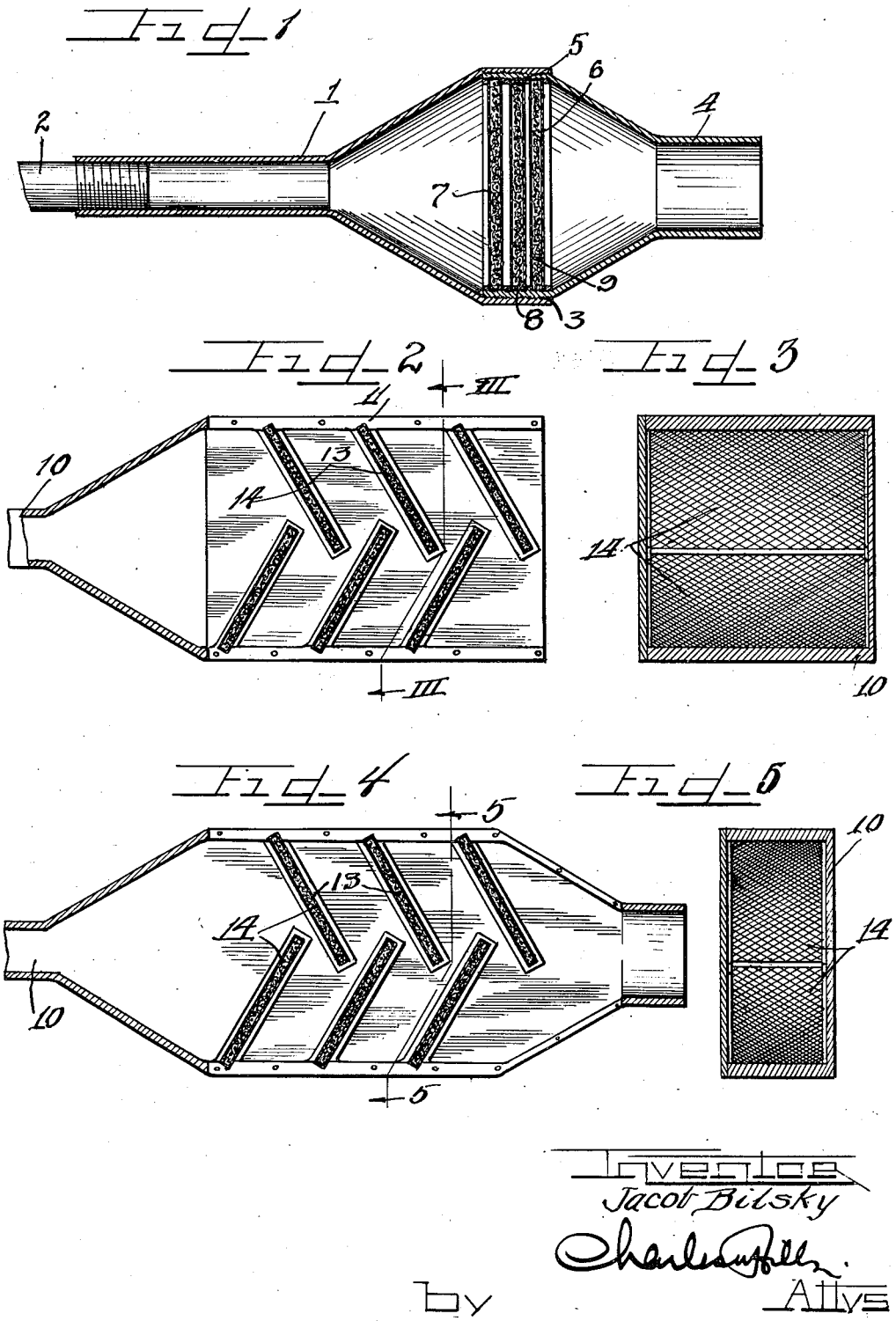

1,716,479

UNITED STATES PATENT OFFICE.

JACOB BILSKY, NOW BY CHANGE OF NAME JOHN GREGORY BILLINGS, OF CHICAGO, ILLINOIS.

GAS ABSORBER FOR PRODUCTS OF COMBUSTION.

Application filed February 9, 1927. Serial No. 166,840.

This invention relates to a gas absorber for products of combustion and more particularly to a chemical absorber for the exhaust gases from internal combustion engines and the like capable of absorbing and fixing the poisonous and obnoxious components of such gases.

As is well known, the exhaust gases from internal combustion engines and the like contain components that are very deleterious to human health, especially when inhaled in confined places such as closed garages. In fact, the inhalation of carbon monoxide gas, which is one of the most dangerous components of the exhaust gases from internal combustion engines, not infrequently results in death. With the congestion of automobile traffic, which has now become so prevalent in large cities, and the use of heavy metal compounds in anti-knock gasolines, the problem of eliminating the poisonous and obnoxious components of motor exhausts has become a very serious one.

It is therefore an object of this invention to provide a gas absorber suitably arranged for attachment to the exhaust pipe of internal combustion engines and capable of absorbing or otherwise fixing the noxious gases and vapors eliminated through said exhaust pipes.

Other and further important objects of this invention will be apparent from the disclosures in the specification and the accompanying drawings.

In the drawings:

Figure 1 is a longitudinal sectional view of a gas absorber embodying the principles of my invention.

Figure 2 is a fragmentary longitudinal sectional view of a modified form of gas absorber.

Figure 3 is a sectional view taken on line III—III of Figure 2.

Figure 4 is a fragmentary longitudinal sectional view of a second modified form of gas absorber, and Figure 5 is a sectional view taken on line V—V of Figure 4.

The reference numeral 1 indicates as a whole a gas absorber embodying the principles of my invention. Said device 1 is preferably formed of aluminum and adapted to be attached to the end of an exhaust pipe 2, such as employed on automobiles and the like for removing the exhaust gases from internal combustion engines. Said device 1 comprises a tubular member having a greatly enlarged threaded end 3 adapted to be coupled with a shorter tubular member 4 having a similarly enlarged portion 5. A gas absorber 6 is adapted to be suitably secured within the chamber formed by said enlarged portions 3 and 5. Said gas absorber 6 preferably comprises a plurality of separate hollow members or baffles 7, 8 and 9, having walls formed of open mesh material, such as wire gauze. Each of said hollow members or baffles 7, 8 and 9, contain specially selected chemical substances adapted to absorb, react or otherwise fix certain components of the exhaust gases, as will now be explained.

As is generally known, the exhaust from gasoline or kerosene internal combustion engines contains relatively large quantities of carbon dioxide and smaller quantities of carbon monoxide, benzol derivatives, unconsumed hydro-carbon vapors, sulphur dioxide, hydrogen, and, of course, water vapor. In addition to these products of combustion and unburnt gases, there may also be present small quantities of lead compounds formed from tetra ethyl lead used as an anti-knock in the gasoline. I propose to "fix" the poisonous and obnoxious components of the exhaust gases by means of suitable chemicals contained within the hollow baffles above described. By the term "fix" is meant any process of absorption or reaction of a physical or chemical nature that will result in the elimination of particular components of an undesirable nature from the exhaust gases.

Absorption of the exhaust gases may, in general, be accomplished either by organic substances such as active carbon, activated charcoal of animal or vegetable origin, and the like, or by inorganic chemicals such as cuprous chloride, copper ammonium sulphate, palladium chloride, calcium chloride, and the like, palladium chloride being particularly efficient in the absorption of carbon monoxide.

The second general method of fixing the various components of exhaust gases is by the formation of complex compounds. For instance, such materials as potassium iodide, potassium acid tartrate, and hæmoglobin serve to react with carbon monoxide to form non-gaseous products, and sugar or other carbohydrates may be suitably used.

The third general method is by oxidation by means of acid, alkaline, or neutral oxidizing compounds, either with or without the use of a catalyst. Among the compounds suitable for this purpose may be mentioned ferric oxide, chromic acid, sodium permanganate, hydriodic acid, boric acid, borax, and others.

The fourth general method is by neutralization. Since in general the exhaust gases are acid in character, caustic and alkaline earth hydroxides carbonates are best adapted for this purpose. Organic compounds, such as sodium phenate and hexamethylenetetramine are also available.

Due to the presence of hydrogen in the exhaust gases, hydrogenation of certain of the products of combustion may be effected by use of a suitable catalyst, such as nickel compounds.

Without limiting my invention to any specific gas fixing ingredients or arrangements thereof, the following will illustrate my preferred gas absorbing and fixing compositions and their arrangement. Preferably three layers of chemicals are used.

The first layer, confined within the hollow baffle 7, comprises a mixture of approximately 40 parts of charcoal.
15 parts of cuprous chloride.
10 parts of cuprous ammonium sulphate.
1 part of palladium chloride.
5 parts of fibrous asbestos.
5 parts of sodium chloride.

The charcoal, of course, serves as a general absorbent for gases, the cuprous chloride and palladium chloride serving to absorb the carbon monoxide. The fibrous asbestos serves as an inert non-combustible material to maintain the chemical substances in an open, porous condition.

The second gas absorber layer, which is of an oxidizing character, is contained within the hollow baffle 8 and comprises the following mixture:

20 parts of charcoal.
10 parts of sodium acetate.
5 parts of boric acid.
3 parts of hydriodic acid.
5 parts of asbestos.
3 parts of borax.
1 part of nickel oxide.

The third gas absorber layer, contained within the hollow baffle 9, serves for the absorption of chlorine compounds and gaseous acids. The materials in this layer are as follows:

35 parts of charcoal.
60 parts of hexamethylenetetramine.
5 parts of asbestos.

In Figures 2 and 3 there is illustrated a modified open form of gas absorber, comprising a tubular member 10 having an enlarged portion 11 of substantially square cross section. Spaced oblique hollow baffle frames 13 are opposingly positioned within the chamber formed by said enlarged portion 11 in staggered relation, so as to partially obstruct the flow of exhaust gases without building up substantial back pressure. Each of said baffles 13 is provided with walls 14 of foraminous material containing chemical substances such as described above.

Similarly in Figures 4 and 5 there is shown a second modified form of device having a rectangular cross section. It will be understood that the particular shape, arrangement of the baffles, or method of attaching the gas absorber device to the exhaust pipe or other outlet, may be varied to suit the particular requirements. The use of the device, furthermore, is not limited to exhaust pipes, but extends to any conduit or opening from which the products of combustion may escape.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A chemical gas absorber of the type described, comprising active carbon, carbon monoxide absorptive chemicals, and chemicals of an oxidizing nature.

2. A chemical gas absorber of the type described, comprising active carbon, carbon monoxide absorptive chemicals, chemicals of an oxidizing nature, and neutralizing compounds for reacting with acid gases.

3. A gas absorber having separate effective absorbing layers, one of said layers containing an absorbent for carbon monoxide, a second of said layers containing an oxidizing chemical, and a third of said layers containing an absorbent for acid gases.

4. A gas absorber having separate effective gas absorbing layers, one of said layers containing an absorbent for carbon monoxide, a second of said layers containing an oxidizing chemical, and a third of said layers containing an absorbent for acid gases, all of said layers containing active carbon and an inert non-combustible filler adapted to render said layers porous.

5. A gas absorber having separate effective gas absorbing layers, one of said layers containing an absorbent for carbon monoxide, a second of said layers containing an oxidizing chemical, and a third of said layers containing an absorbent for acid gases, all of said layers containing activated charcoal and asbestos fibres adapted to render said layers porous.

6. A chemical gas absorber of the type described, comprising active carbon and carbon monoxide absorptive chemicals, and an oxidizing catalyst.

7. A gas absorber for products of combustion, comprising a plurality of separate layers, one of said layers containing cuprous chloride and palladium chloride for absorbing carbon monoxide gas.

8. A gas absorber for products of combustion, comprising a plurality of separate layers, one of said layers containing hexamethylenetetramine.

In testimony whereof, I have hereunto subscribed my name at Chicago, Cook County, Illinois.

JACOB BILSKY.